United States Patent [19]

Wheeler et al.

[11] Patent Number: 4,477,546
[45] Date of Patent: Oct. 16, 1984

[54] LATTICE FOR A BATTERY ELECTRODE SUBSTRATE

[75] Inventors: James R. Wheeler; Jack N. Brill, both of Joplin; Lee E. Miller, Carl Junction, all of Mo.

[73] Assignee: Eagle-Picher Industries, Inc., Cincinnati, Ohio

[21] Appl. No.: 463,632

[22] Filed: Feb. 3, 1983

[51] Int. Cl.$^3$ .............................................. H01M 4/73
[52] U.S. Cl. .................................... 429/211; 429/241
[58] Field of Search ............... 429/211, 241, 233, 234, 429/242, 243, 244, 101

[56] References Cited

U.S. PATENT DOCUMENTS

| | | | |
|---|---|---|---|
| 1,044,831 | 11/1912 | Wackwitz | 429/211 |
| 1,129,690 | 2/1915 | Knobloch | 429/243 |
| 1,528,963 | 3/1925 | Adams et al. | |
| 3,453,245 | 7/1969 | Duddy | 429/244 |
| 3,532,545 | 10/1970 | Babusci et al. | 429/241 |
| 3,923,545 | 12/1975 | Margulies | |
| 4,221,852 | 9/1980 | Qureshi | 429/211 |
| 4,250,235 | 2/1981 | DuPont et al. | |
| 4,283,844 | 8/1981 | Milden et al. | |

FOREIGN PATENT DOCUMENTS

| | | | |
|---|---|---|---|
| 1010039 | 3/1952 | France | 429/233 |
| 1104093 | 2/1968 | United Kingdom | 429/233 |

Primary Examiner—Donald L. Walton
Attorney, Agent, or Firm—Wood, Herron & Evans

[57] ABSTRACT

An improved substrate for a battery electrode is disclosed. The substrate is in the form of a reticulated lattice bordered by a current conducting perimeter and having a current connection or tab on the perimeter. The lattice is comprised of first current carrying portions which converge toward an imaginary point outside the perimeter of the substrate, which point can lie on an imaginary bisector to the lattice. Second current carrying portions intersect the first current carrying portions and extend generally perpendicularly to them at the points of intersection. The lattice thus formed improves the current density of the electrode and provides for a more uniform current distribution, serves to focus current flow in the direction of the conducting tab, and mechanically strengthens the tab connection to the substrate.

8 Claims, 2 Drawing Figures

THE INVENTION

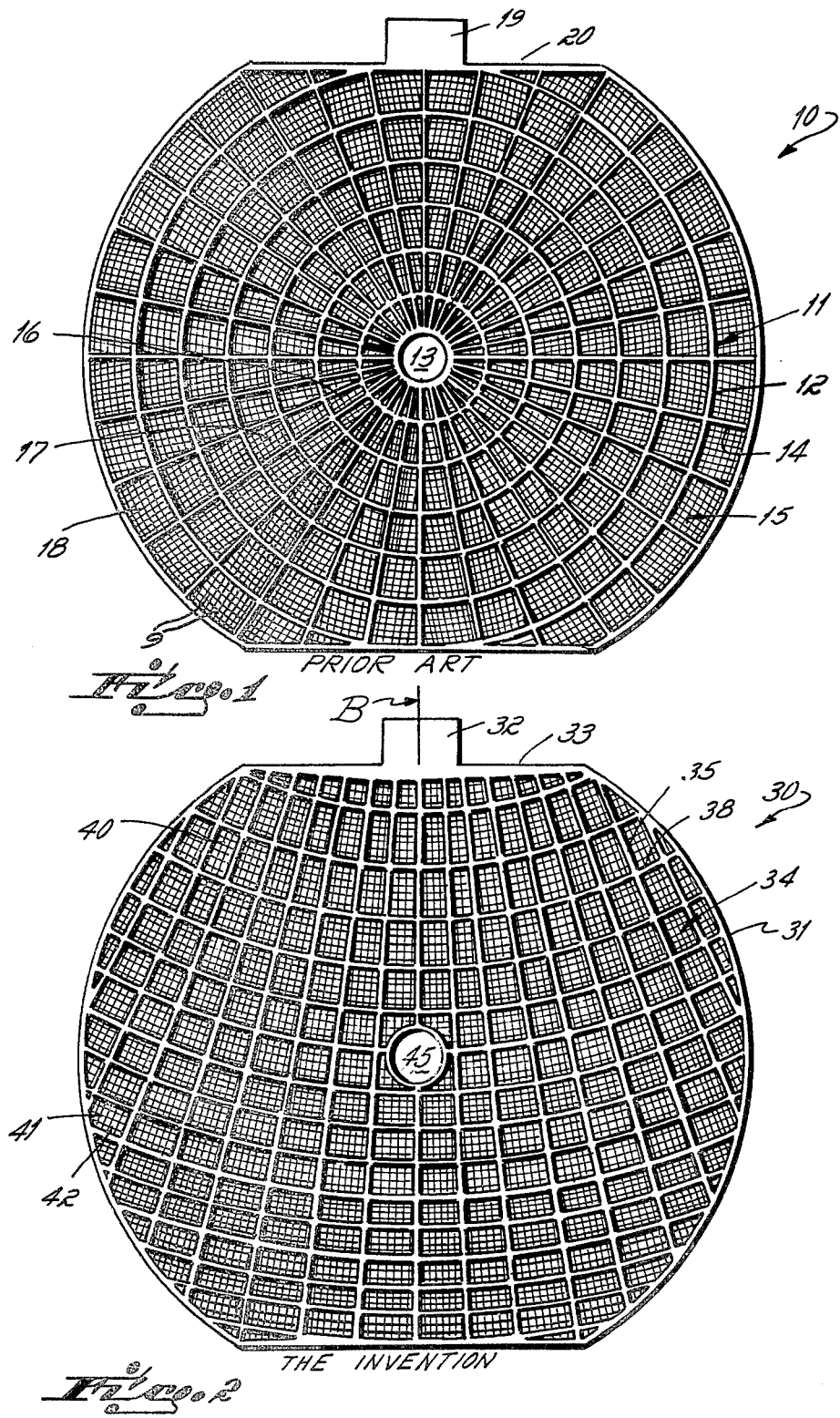

LATTICE FOR A BATTERY ELECTRODE SUBSTRATE

FIELD OF THE INVENTION

This invention generally relates to a battery electrode substrate, and particularly relates to a reticulated, thin, generally planar substrate in the form of a lattice which presents a surface for receiving an electrochemically active material.

BACKGROUND OF THE INVENTION

It is well-known in the art to form electrode substrates of a foraminous or latticed electrically conductive material which serves as a support for the active material of the cell. These electrode substrates may be extremely thin (of the order of 0.08 mm.), generally planar in form and adapted to conform to the general cross section of the battery in which they are stacked. For example, it is known to provide nickel hydrogen batteries with circularly shaped hydrogen-reacting electrodes in a cylindrically shaped housing, wherein the substrates are formed by chemically etching nickel foil in a known manner to form a lattice, to which a platinum slurry is then adhered. The electrodes are arranged as a stack with like electrodes interconnected via conducting tabs provided at the periphery of each substrate. Each tab further serves as a means of support for its electrode in the cell stack. A hole is provided through the center of each electrode to align the electrodes in the stack.

As shown in U.S. Pat. No. 4,250,235, it is also known to make such circular electrodes out of etched nickel sheet material, and providing the substrate with the conducting and support tab located at a point adjacent the center of the substrate.

In general, it has been the practice to shape the substrate lattice of such prior art electrodes in the form of a conductive open mesh screen having a series of concentric circular, regularly spaced portions centered on a central alignment hole, and which are intersected or connected by other portions extending radially from the alignment hole. These intersecting radial and circular portions define segment areas between them which decrease in area toward the center of the substrate. Superimposed upon this primary pattern is a narrower secondary pattern of thinner radial and circular conducting portions dividing the sections formed by the primary pattern into a mesh of still smaller segmented areas. A tab by which the electrode is electrically connected to other electrodes is provided either at the perimeter of the lattice or at the central alignment hole.

On the one hand, in conducting electric current collected to a battery terminal, electrical resistance loss in conduction reduces the cell efficiency by sapping cell voltage while also adding heat caused by the metal's resistance. On the other hand, it is necessary to maximize the open areas of the electrode substrate within which the active material is carried in order to maintain adequate ion transfer in the cell stack and optimize the collection capacity of the electron collector. Hence, the expanded lattice form for the electrode substrate.

In the above-described prior art substrate lattice wherein the tab is on the perimeter, the current flow within the lattice is not directed or "focused" toward the conductive tab. Rather, the geometric focus of the lattice is the central alignment hole, which is not electrically active. The current carrying capacity of the electrode is thus not used effectively in that the current carrying area increases in the direction away from the tab, rather than in the direction toward it.

So, too, with the tab located adjacent the center of the substrate, as in U.S. Pat. No. 4,250,235, only a small proportion of the electron flow along the radial portions follows a straight route to the tab; rather, the radial portions terminate in a relatively narrow inner ring defining the center aperture, which then provides a part of the electron flow area to the tab.

Another deficiency presented by these prior art lattices is that there is little structural strength provided in the area of the tab, which is the point of attachment of the electrode in the cell stack, and consequently a point of stress on the electrode. It has been observed that the tabs are sometimes torn off the electrodes, thus eliminating the usefulness of those electrodes within the cell stack.

Yet another difficulty with these prior art forms of substrate lattices is that they provide non-uniform areas for carrying the active material. The areas defined by the primary lattice "radials" and "circumferentials" diminish toward the center of the lattice; the ratio of the metal area to the open area sharply increases. This inefficiently uses the electron collection capacity of the electrode due to the non-uniformity in adhered active material-substrate contact areas, and gives rise to undesirable non-uniform current densities across the electrode. The smaller lattice areas also present difficulties in the proper adhesion of the catalyst or active material, particularly adjacent the center aperture of the electrode.

SUMMARY OF THE INVENTION

It has been a primary object of this invention to provide an improved electrode substrate having a reticulated lattice which serves to direct or focus current flow toward a peripheral conducting tab. Another object has been to provide the foregoing lattice such that generally rectangular sections of nearly uniform area are defined across the lattice.

A further object is to provide an improved electrode substrate having short current paths substantially directed to the conducting tab and improved paste adherence.

Yet another object has been to increase the strength of the lattice in the area of the tab. Still another object has been to provide a more uniform primary lattice pattern to thereby promote uniformity of current distribution and density across the electrode and better adhesion of active material to the substrate.

These and other objects and advantages of this invention have been accomplished by the provision of a battery electrode substrate lattice having a first group of primary current carrying portions or "radials" which converge angularly toward an imaginary point outside of the perimeter of the substrate, beyond the tab which is on the periphery. A second group of current carrying portions or "transversals" intersects the first group and extends generally perpendicularly to the first group at the points of intersection and across the area defined within the perimeter of the substrate. In a preferred form, the first and second groups of primary conduction portions are so spaced to define generally rectangular sections of nearly constant area over the entire area of the lattice, except where interrupted by the perimeter or rim.

Provision of a first group of primary current carrying portions converging in the direction of that portion of the substrate perimeter which carries the tab serves to focus the current flow more in the direction of the tab. This better utilizes the current carrying capacity of a given cross section of the metal and advantageously provides for a shorter current path along the substrate radials to the tab while still maintaining an optimum open mesh area for ion exchange. Provision of radials in this manner further serves to increase the strength of the tab attachment by increasing the ratio of metallic lattice to open mesh adjacent the tab, and also serves to better distribute any force applied to the tab across the entire lattice.

In a preferred form, rectangular sections of nearly constant area are provided by the primary lattice portions. This increases the efficiency of the electrode by providing nearly constant areas of adhered catalytic material, thereby improving the current distribution and density across the electrode. The nearly constant area rectangular sections further provide for more consistent adhesion of the catalyst to the lattice.

The first conductive portions are supplemented by smaller (narrower) secondary conductive portions in this preferred form of the improved substrate. The secondary conductive portion form a regular open mesh conducting network extending across the generally rectangular sections formed by the primary portions. For example, it has been found advantageous to provide these secondary conductive members in a pattern duplicating that of the primary lattice. That is, the secondary conductive network or mesh formed within each of the primary sections comprises first spaced lines extending generally in the direction of the focus and generally parallel to the "radials" of the sections, and second similarly spaced lines extending generally parallel to the transversals of the sections and roughly concentric with the focus. Forming the secondary lattice in this manner further promotes the current flow toward the peripheral tab while optimizing the current flow density across the electrode.

The foregoing objectives, features and advantages of the present invention will be more readily understood upon consideration of the following detailed description of the invention taken in conjunction with the accompanying drawings, in which:

BRIEF DESCRIPTION OF THE DRAWINGS

FIG. 1 is a plan view of an electrode substrate lattice in accordance with the prior art;

FIG. 2 is a plan view of an improved electrode substrate lattice in accordance with a preferred embodiment of this invention.

DETAILED DESCRIPTION OF THE PREFERRED EMBODIMENT OF THE INVENTION

The improved electrode of this invention has found particular application in a cylindrically shaped nickel-hydrogen battery, such as the type used in telecommunication satellites as shown in U.S. Pat. No. 4,250,235, the disclosure of which is incorporated herein by reference. As a consequence of the high internal pressure (600–1000 psig) ordinarily maintained within this type of battery, the shape of the main body of the battery is generally cylindrical, with hemisperical end portions. The shape of the battery consequently dictates a generally circular geometry for the peripheral shape of the electrodes employed. It will nevertheless be recognized that although the instant invention will be described in detail in this exemplary environment, that is, having a generally circular shape, the improved electrode substrate of this invention has application to any geometric shape for a generally planar-type electrode. Also, although the electrode substrate of this invention has found particular application in a nickel-hydrogen battery, it will be recognized that it would find utility in other batteries; for instance in NiCd and NiFe batteries for the positive and/or negative electrode substrates, as well as the substrate in a lithium non-aqueous battery, amoung specific examples.

Referring now to FIG. 1, a prior art substrate considered most relevant is of a generally planar type electrode, and is shown generally at 10. The shape of the substrate approximates a circle around its perimeter owing to its application in the above described nickel-hydrogen ($NiH_2$) battery. The substrate is formed from a thin metallic nickel foil which has been electrolytically plated or perforated in a known manner to create the desired lattice structure to the substrate. The electrode substrate 10 in use in an $NiH_2$ battery is loaded with a platinum catalyst slurry adhered to the substrate.

Negative electrodes or electron collectors such as described herein are organized in repetitive sets in a cell stack having a plurality of such negative electrodes aligned in spaced relation; a positive electrode formed of a foraminous sintered nickel impregnated with nickelous hydroxide is part of each set, and separated from the negative electrode by a separator. The electrolyte is ordinarily a water solution of potassium hydroxide.

The prior art substrate 10 has a primary conductive lattice indicated at 11 comprised of radially spaced concentric portion or lines 12 which are concentric with a central alignment aperture or hole 13. The aperture 13 is primarily useful for maintaining the alignment of the electrodes within the cell stack through the insertion of a non-conductive rod (not shown) through the centers of each of the electrodes in the stack.

Also extending from a focus generally at the center of the alignment hole 13 are radially extending portions or lines 14 which are in regular spaced relation around the alignment hole. The radial lines 14 begin at the alignment hole 13 and terminate at the periphery of the substrate.

The current carrying network formed by these prior art primary lattice portions 12 and 14 form a pattern for the substrate that can be likened to a spider's web. The interior sections, generally indicated at 15, defined by the intersection of the portions 12 and 14 are irregular in shape; for instance, there are very narrow, roughly triangular shaped regions 16 adjacent the alignment hole 13, trapezoidal shaped sections 17 approximately halfway to the periphery of the substrate 10, and substantially rectangular shaped segments 18 located adjacent the periphery.

Extending across the various size areas defined within these sections 15 is a secondary lattice of thinner or narrower conductive mesh portions 9 forming a reticulated gridwork or mesh of small rectangular sections. It is this secondary lattice which forms the principal surface upon which the active catalyst is adhered to the substrate herein. The mesh is so designed that the small rectangular sections formed are sufficiently small to provide a good adhesion structure for the catalyst, which is typically applied as a slurry.

A conductor tab 19 is located on a chordal portion 20 of the substrate 10, and serves as the support means and electrical inter-connecting means for the electrode substrate within the cell stack.

With the prior art substrate 10 so described, several drawbacks to this design can now be observed. A principal drawback in this design is the lack of focus on the conductor tab 19 for the current flow carried by the substrate lattice. That is, the concentric lines 12 and the radial portions 14 of the primary lattice 11 have as their focus the alignment hole 13 in the center of the electrode, whereas the actual electrical connection for the electrode in the cell stack is made at the tab 19. This lattice design better serves to maximize the current density toward the center of the substrate, rather than toward the tab 19; that is, it is inefficient in its use of available metal area, providing excess area where it is not needed (at the center), and little area where it is needed, reducing the electromotive efficiency of the electrode.

The prior art substrate 10 also produces an uneven current flow distribution and flow density across the electrode. This is caused by the increasing ratio of metal lattice to adhered catalyst as one progresses from the periphery of the electrode inwardly to the alignment hole 13. As a consequence, more active catalyst is contained per unit area on the periphery of the substrate 10 and less in the middle, as evidenced by the decreasing area of the sections 15 as the center of the substrate is approached. A further undesirable aspect of this prior art design is the difficulty in obtaining good adhesion of the catalyst in the smallest lattice sections, such as sections 16.

A significant mechanical difficulty presented by this prior art design is a deficiency in structural support for the tab 19 by the lattice 11. It has been observed in this type of substrate that the tab can be torn loose from the periphery of the substrate, such as by an impact to the battery, thereby eliminating the usefulness of a disconnected electrode in the cell. This problem is largely the result of the high ratio of open mesh to metal lattice in the area of the tab 19, as compared to that ratio near the center of the substrate.

These same drawbacks of the described prior art substrate lattice 10 generally apply to the substrate shown in U.S. Pat. No. 4,250,235. The majority of the radial conductors of the '235 lattice terminate on the relatively thin inner or center ring of the subsrate. This forces the majority flow of collected current around a single, relatively thin, semicircular pathway to the conducting tab. The '235 substrate also has decreasing area for the major lattice sections as the center of the substrate is approached, and provides little in the way of mechanical support and reinforcement for the conducting tab against tearing or torque forces.

FIG. 2 shows an improved electrode substrate generally indicated at 30 made in accordance with the principles of this invention. The thin planar substrate 30 has an outer peripheral edge 31 having a small width which defines a generally circular shape for the substrate 30. Again, this geometry for the substrate 30 is imposed by the cylindrical shaped NiH$_2$ battery casing in which this particular embodiment of the invention has been adapted for use. A conducting tab 32 is located along a chordal portion 33 of the perimeter of the substrate 30.

The structure of the improved substrate 30 departs significantly from that of the prior art substrate 10 in the primary lattice employed, generally indicated at 34.

The primary lattice 34 has a first group of conducting lines or radial portions (radials) 35 which extend radially or radiate in regularly spaced relation from an imaginary focus along a bisector B to the substrate 30. The bisector B passes through the center of the substrate and the tab 32, with the imaginary focus located at a point (not shown) along the bisector beyond the perimeter 31 of the substrate. In the preferred embodiment shown, the imaginary point toward which the radials 35 converge angularly lies about one electrode diameter beyond the perimeter, but this is not critical. These radials 35 begin along the perimeter of the substrate 30 and primarily along the chordal portion 33, and extend in straight line fashion across the substrate 30, where they terminate at the perimeter thereof.

The primary lattice 34 is completed by a second group of conducting lines or transverse portions (transversals) 38 which are in radially spaced relation relative to the imaginary focus. The transversals 38 extend across the substrate 30 from one peripheral side of the substrate to the other. The second group of lines 38 intersect and interconnect with the radials 35 at approximate right angles. As a consequence of this design, the primary lattice divides the substrate 30 into generally rectangular sections 39. Moreover by appropriate radial spacing of the transversals 38, these sections 39 are of substantially equal area, and extend across the entire substrate except immediately adjacent the perimeter. It has been found advantageous in this embodiment to provide the primary lattice in a pattern which produces generally rectangular sections 39 each having an area of approximately 0.04 square inches.

The location of the imaginary focus outside of the periphery of the substrate 30 represents a compromise between the need to increase the structural strength of the lattice in the region of the tab 32, and the desired focusing of the current flow in the general direction of the tab 32. It is obvious that other points for the imaginary focus can be chosen either closer to or further away from the periphery of the substrate; in this particular application of the invention, this pattern for the radials 35 and transversals 38 has proven to be advantageous in the formation of rectangular sections 39 which are so narrow as to interfere with good catalyst adhesion, as well as a maximization of the open area available for ion transfer on the substrate. Also, it will be understood that although the tab 32 has been described as being located along the bisector to the substrate 30, it may be located anywhere along the chordal portion 33 with advantageous, although somewhat diminished, results. It will be noted that the chordal portion 33 is tapered to be slightly wider nearer the bisector B, than at the ends. This adds additional structural support immediately adjacent the tab connection, and improves current flow in this region of maximum radial terminuses.

A secondary lattice is made up of a network of narrower portions or lines 40 which extend across the sections 39. As shown here, the secondary lattice is advantageously formed in a pattern substantially identical to that of the primary lattice 34. That is, radially extending secondary lattice portions 41 generally radiate from the imaginary focus in spaced relation and generally parallel to the radials 35. Secondary lattice portions 42 extend transversely across the substrate 30 in radially spaced relation from the imaginary focus, and are generally parallel to the transversals 36. A mesh or network of generally orthogonally arranged secondary portion 41 and 42 is thus provided within each section 39.

The secondary lattice functions as the chief adhesion surface for the activated catalyst, which is adhered to the substrate 30 in a known manner. The mesh openings defined by the secondary lattice portions 41 and 42 are thus provided of a sufficient size to permit adequate adhesion of the catalytic material to the substrate. It will of course be recognized that the precise arrangement of the pattern for the secondary lattice need not follow the above described preferred pattern, inasmuch as the principal function of the secondary lattice is simply to provide a satisfactory conductive mesh structure for adhesion of the catalyst.

An alignment hole 45 is provided in the approximate center of the substrate 30 which is used to align the plural electrodes employed in a battery, as previously described.

An immediate advantage of this improved design for the electrode substrate 30 is that the lattice tends to focus the electron flow and thus the current in the direction of the tab 32. This effect is achieved primarily by the primary lattice 34, and is further enhanced by the preferred arrangement of the secondary lattice described above. This improves the efficiency of the substrate by reducing the electrical resistance to the current flow through a shortening of the current path through the connectors.

The improved design for the substrate 30 also significantly improves the current flow distribution and therefore the current carrying capacity of the electrode. This is due to the formation of the generally rectangular sections 39 which define relatively constant areas therein. As a consequence, catalytic material is more evenly distributed across the entire substrate 30. Current densities are therefore more uniform across the substrate.

Additionally, the ratio of metallic lattice to open mesh increases as the tab 32 is approached. The presence of more metallic lattice in the general vicinity of the tab therefore reinforces this area against the tab 32 tearing loose. The structural strength of the chordal portion 33 is likewise significantly improved by virtue of the distribution of any tearing or torque forces along essentially the entire network of radials 35. The provision of rectangular sections 39 of relatively constant area predominating the structure of the substrate also provides a good adhesion surface for the active catalyst.

While the principles of this invention have been described above in connection with a specific preferred embodiment of the invention as adapted for use as an electron collector in a nickel-hydrogen battery, it is to be clearly understood that this description is made only by way of an example and not in limitation of the scope of the invention. For instance, while the invention has been illustrated as applied to a generally circular planar-type electrode substrate used in a cylindrical battery casing, it will be understood that the invention is deemed applicable to any type of geometry for an electrode substrate of the kind described.

What is claimed is:

1. In a substrate for a battery electrode, said substrate being in the form of a reticulated lattice bordered by a perimeter and having a current conducting tab on a portion of said perimeter, the improvement wherein said lattice comprises;
   first current carrying portions within the perimeter which are angulated to one another and which converge in straight lines toward an imaginary point outside the perimeter of the substrate, and
   second current carrying portions within the perimeter and intersecting the first current carrying portions and extending generally perpendicularly thereto at the points of intersection,
   the lattice thus formed by the first and second portions defining therein generally rectangular sections which are of substantially equal area.

2. The improved substrate of claim 1, further including a second reticulated lattice, the second reticulated lattice comprising third and fourth current carrying portions which are relatively narrower than the first and second current carrying portions, and which respectively extend generally parallel to the first and second members in spaced relation thereto, the second lattice portions forming a grid of generally rectangular sections within the sections defined by the first lattice.

3. The improved substrate of claim 2, wherein the sections formed enclose areas of about 0.04 square inches.

4. The improved substrate of claim 2, wherein the portions are formed of nickel.

5. The improved substrate of claim 2, wherein the substrate is formed of electroplated nickel.

6. In an electrode substrate which is generally circular in shape, and which has a current conductor tab on a chordal portion of the periphery of the substrate, and wherein the substrate is formed with a large number of apertures for receiving active catalytic material, the improvement comprising:
   a primary reticulated lattice for the substrate,
   the lattice having a first group of current carrying lines extending as radials from the chordal portion of the substrate and across the substrate, the radials converging in straight lines toward an imaginary focus outside the perimeter of the substrate, which imaginary focus lies on an imaginary line bisecting the lattice, the tab further being located along the bisector,
   and a second group of current carrying lines extending generally perpendicular to the first group and across the substrate,
   the first and second groups forming a primary current focusing lattice for the substrate, the lattice defining generally rectangular sections of nearly constant area.

7. The improved electrode of claim 6, wherein the substrate includes a second reticulated lattice, the second lattice formed of lines relatively narrower than those of the first lattice, and comprising a first group of secondary lines extending generally parallel to the first group of primary lines, and a second group of secondary lines extending generally parallel to the second group of primary lines, the first and second groups of secondary lines forming generally rectangular sections of nearly constant area.

8. The improved electrode of claim 7, wherein the portion of the substrate periphery is tapered wider adjacent the tab and thinner adjacent the ends of the chordal portion.

* * * * *